Figure 5:
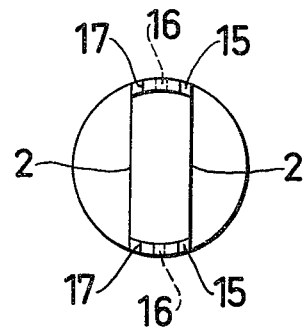

United States Patent [19]

Hellander

[11] 4,250,652

[45] Feb. 17, 1981

[54] CASTING WEIGHT

[76] Inventor: Roland Hellander, 9 Gamla Landsvägen, Arvidsjaur, Sweden, S-930 80

[21] Appl. No.: 942,756

[22] Filed: Sep. 14, 1978

[30] Foreign Application Priority Data

Sep. 15, 1977 [SE] Sweden .................................. 7710336

[51] Int. Cl.³ ........................ A01K 97/04; A01K 91/00
[52] U.S. Cl. ....................................... 43/41.2; 43/43.1; 43/43.11
[58] Field of Search ..................... 43/43.11, 43.1, 41.2

[56] References Cited

U.S. PATENT DOCUMENTS

| | | | |
|---|---|---|---|
| 1,453,987 | 5/1923 | Mills | 43/43.1 |
| 1,915,208 | 6/1933 | Walthers | 43/43.11 |
| 2,260,705 | 10/1941 | Eguchi | 43/41.2 |
| 2,592,441 | 4/1952 | Louthan | 43/43.11 |
| 2,605,576 | 8/1952 | Young et al. | 43/43.1 |
| 2,934,850 | 5/1960 | Moe | 43/43.11 |
| 3,214,858 | 11/1965 | Louie | 43/43.11 |
| 3,453,768 | 7/1969 | Feaster et al. | 43/43.13 |
| 3,703,783 | 11/1972 | Pool | 43/43.11 |
| 3,977,115 | 8/1976 | Check | 43/43.11 |

FOREIGN PATENT DOCUMENTS 551172  1/1958  Canada ................................ 43/43.1

Primary Examiner—Othell M. Simpson
Assistant Examiner—J. T. Zatarga
Attorney, Agent, or Firm—Cushman, Darby & Cushman

[57] ABSTRACT

This invention relates to a device at a casting weight intended for e.g. a casting rod for casting of preferably light lures, such as fly casts or other lures suspended on a line by means of suspension snells or the like, for storage of said lures in the casting weight when fishing is not carried out. This type of casting weight, to which the invention relates, may include a casing provided with a predetermined or adjustable weight and comprising a float body, and, according to the invention, a number of outwardly open partitions separated from each other are arranged in the casing and separated from its float body for storage of each their lure, a locking means for locking the suspension snell of the lure introduced in its associated partition being arranged in the connection of each such partition, in addition to which means are arranged for winding on the line carrying the lures and attached to the casting weight around the casing in planes leaving the partition openings and the locking slits free from successive introduction of the lures in the partitions and locking of the suspension snells thereof in the locking slits as the line is wound on the casing.

7 Claims, 14 Drawing Figures

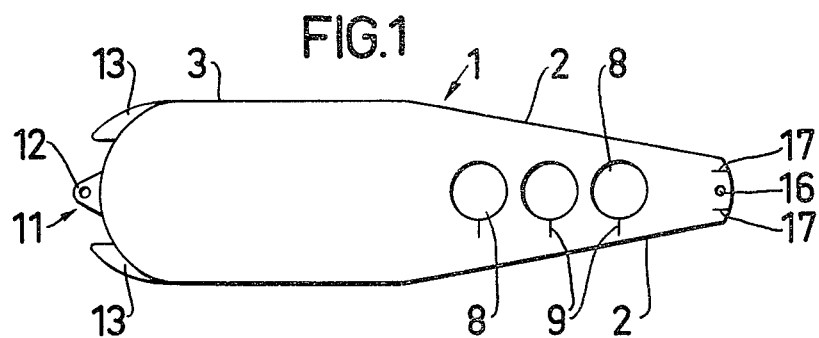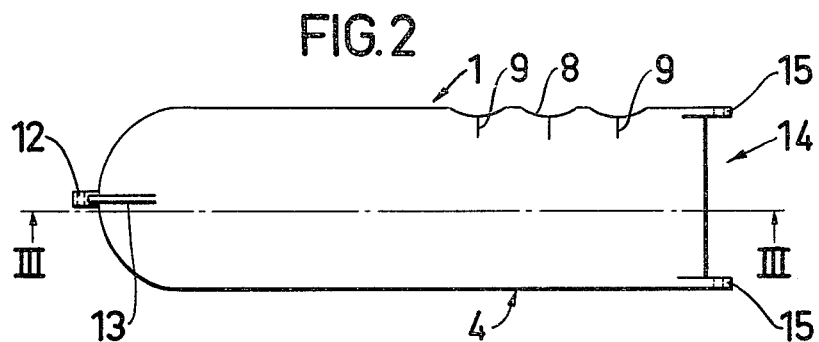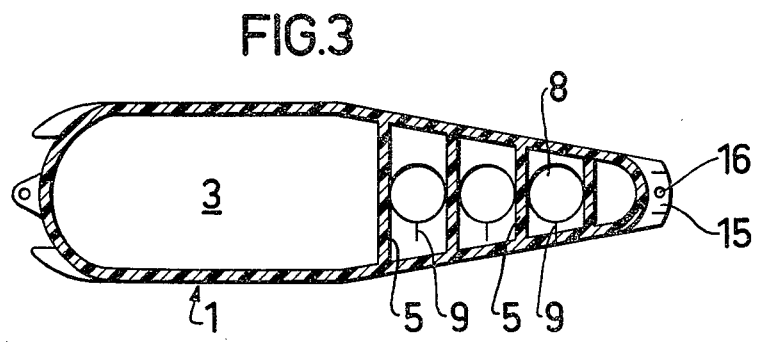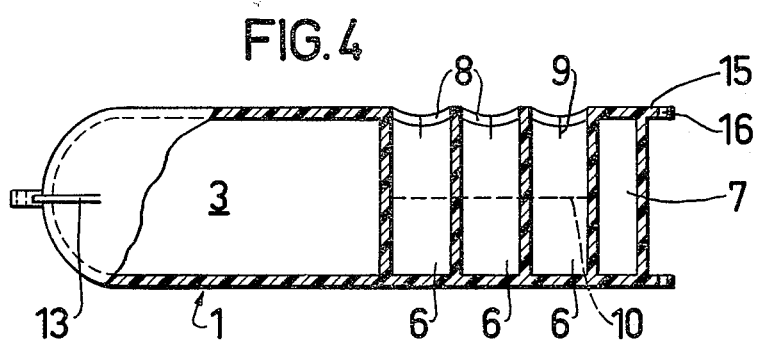

CASTING WEIGHT

This invention relates to a fishing tackle intended for use in fishing with casting rods and the like, more specifically a casting weight normally used for obtaining greater casting lengths with light lures, such as flies, fly cast etc. and is to provide such a casting weight which also can be used as a storage means for lures, preferably for fly casts, which have a great tendency to get entangled in themselves and in other fly casts, casting-lines and accessories often kept together, and as such a storage means in which a lure, e.g. a fly cast, applied to the casting weight is stored in a safe way and without any possibility that the lure gets entangled in itself or other lures and thanks to which the fly cast can be quickly prepared for a cast.

According to the invention this is achieved with a casting weight comprising a casing enclosing a float body and provided with a predetermined or adjustable weight, a number of separated partitions for storage of each their lure being arranged in the casing and separated from its float body, a locking means in the form of a slit made in the casing and with a decreasing width from the partition for locking of the suspension snell of the lure introduced in its associated partition being arranged, in addition to which means are arranged for winding the line supporting the snells on the casing in planes leaving the openings of the partitions and the locking means free for a successive introduction of the lures in the partitions and locking of their associated suspension snells in the slits during winding of said line.

Figure 6:
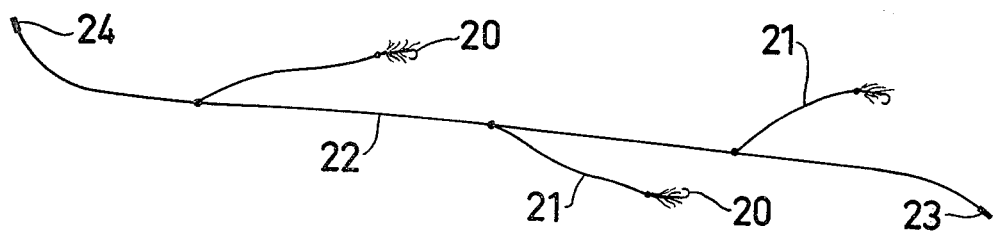
Figure 11:
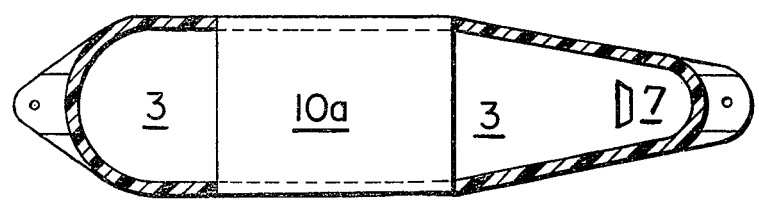
Figure 7:
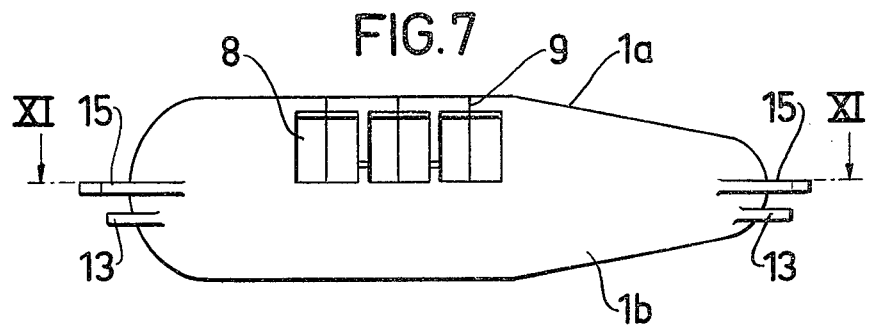
Figure 8:
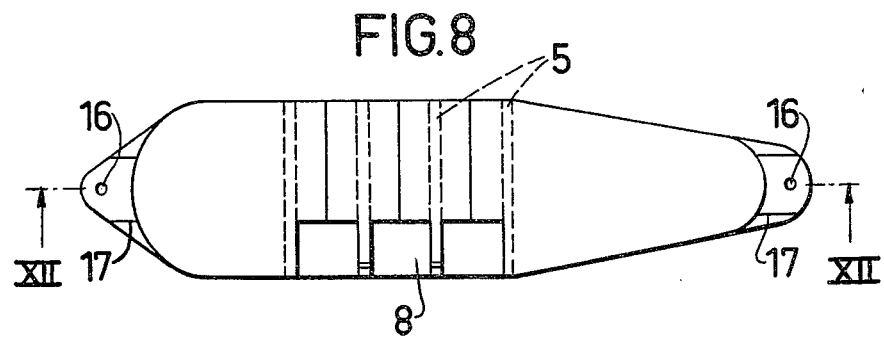
Figure 9:
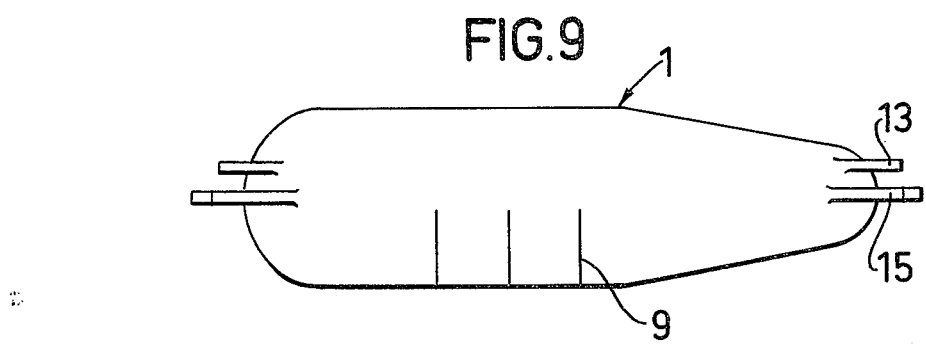
Figure 10:
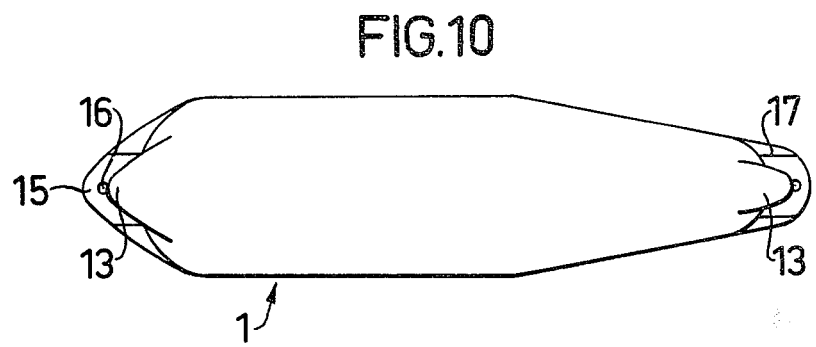
Figure 12:
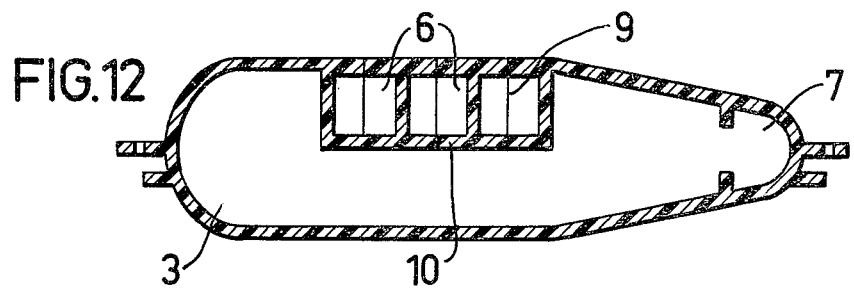
Figure 13:
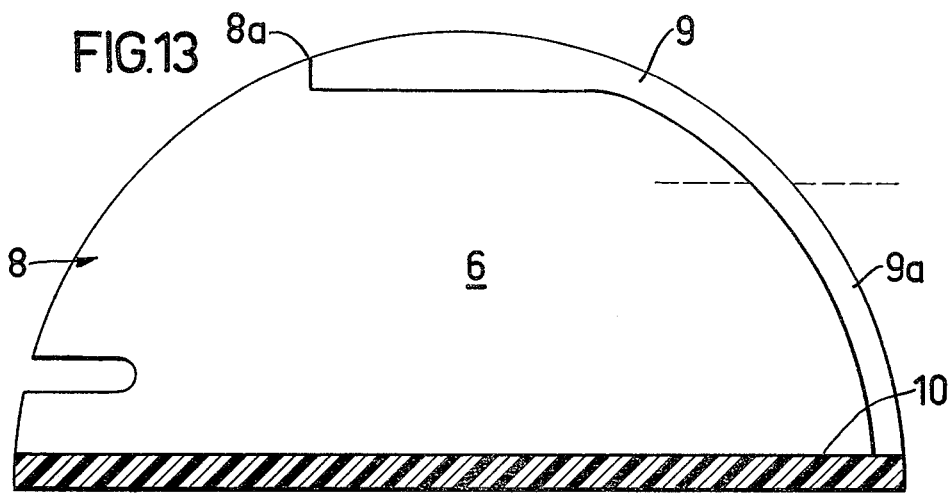
Figure 14:
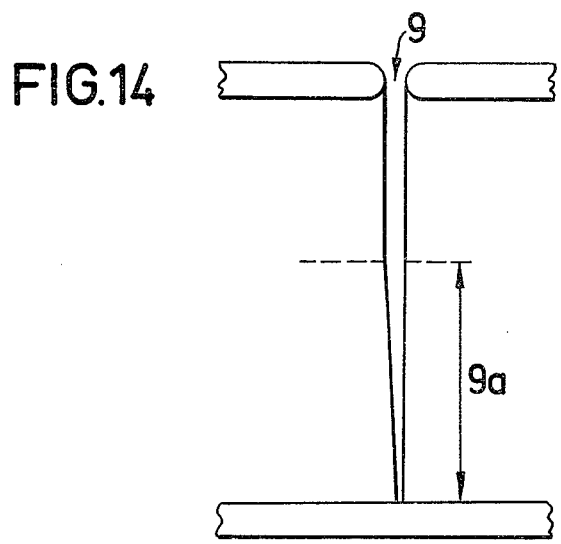

The invention is described in the following more closely with reference to the enclosed drawings, in which FIG. 1 shows a top view of a preferred embodiment of the casting weight of the invention provided with storage function, FIG. 2 shows a lateral view of said embodiment, FIG. 3 shows a section along the line III—III in FIG. 2, FIG. 4 shows the same view as FIG. 2 but partly in section, FIG. 5 shows an end view of the casting weight, FIG. 6 shows schematically a fly cast, for which the casting weight of the invention can be used for casting and for storage of the same, FIG. 7 is a side view of a modified embodiment, FIG. 8 is a top view of the FIG. 7 embodiment, FIG. 9 is a view of the FIG. 7 embodiment from the opposite side, FIG. 10 is a bottom view of the FIG. 7 embodiment, FIG. 11 shows a section along the line XI—XI in FIG. 7, FIG. 12 shows a section along the line XII—XII in FIG. 8, FIG. 13 shows on an enlarged scale a section of a partition and FIG. 14 illustrates on an enlarged scale a locking means according to the invention.

The embodiments of the casting weight of the present invention only shown as examples comprise a floatable body or casing 1 made from a plastic material, preferably soft plastic, which casing is shown to have a substantially circular cross sectional form across part of its length and which is then transformed into a substantially rectangular cross-sectional form narrowing off towards the end and with two substantially flat sides 2. However, the form shown is not specific to the casting weight according to the invention but can be varied and changed in several different ways without the function of the casting weight as casting weight or as storage means being risked.

Said cylindrical part 3 is the float body of the casting weight, which is shown as completely sealed in the drawings but in other embodiments can be provided with a sealable hole for filling or tapping of water, sand or the like for adaptation of the weight of the casting weight. In the narrowing portion 4 of the casting weight a number of storage partitions 6, 7 separated from each other and from the float body by means of walls 5, are arranged of which that designated by 7 in the embodiment shown is intended for lead weights, whereas the other partitions 6 are made as storage partitions for lures, e.g. flies of a co-called fly cast, and are provided with each their opening 8, through which a fly can be introduced in the relative partition 6. The partition 7 is shown without an opening, and in this case the lead weight is cast directly at the manufacture of the casting weight, but this partition 7 can of course be provided with an opening tightly sealable by means of a cover or the like for inserting or taking out the lead weight so that the weight of the casting weight can be adapted to the existing conditions. Other weights than lead weights can of course be used.

In connection with each opening 8 of a storage partition 6 there is arranged a locking means 9 in the form of a slit for locking and retaining a line supporting a lure introduced in its associated partition. Each such slit 9 tapers toward a narrow end remote from the opening 8, and in this way it functions as a locking means independently of which line size is used. Each such slit may e.g. have a maximum width of about 0.6–0.7 mm and a minimum width of about 0.1 mm as well as a length of about 5–8 mm. The locking function of the slits 9 will also be safer if the casting weight is made from a soft plastic material, which is therefore to be preferred to a stiff plastic.

Even if not shown in the drawings another slit placed approximately right opposite to that shown can be arranged in connection with each opening 8, and, moreover, in accordance with the present invention the storage partitions 6 may be designed as double partitions with bottom between the partitions, which is schematically indicated by means of a dash line 10 in FIG. 4, and with an opening 8 with its associated locking means 9 for each such partition.

At its end designated by 11 the casting weight is provided with an eye 12 for attaching a fishing-line or a bait line, i.e. a line carrying one or more lures. On both sides of this eye 12 projecting ears 13 are arranged on the same level as the eye 12. Said bait line is intended to be wound on the casting weight between said ears. For the same function as these ears two flanges 15 are arranged at the other end 14 of the casting weight, which flanges lie in the same plane and turned 90° relative to the plane of the ears 13 and each of which is designed with holes 16 for tieing securely a fishing-line or a bait line and with slits 17 of the same type as the slits 9 for locking the final end of the bait line when this has been wound on the casting weight for storage.

The embodiment of the casting weight shown in the enclosed drawings is useful for a fly cast, which, as is schematically shown in FIG. 6, may comprise three flies 20 provided with hooks, which are suspended by means of each their suspension means or suspension snells 21—as a rule with a length of 0.1–0.2 mm—after each other on a line 22—previously called bait line—with a length that can amount to 1.5 to 2 m or still more if the number of flies is increased. This fly cast can be attached in use either before or after the casting weight; in the first case the line 22 is thus attached to the eye 12 of the casting weight e.g. by means of its end 23, which may be provided with a swivel or security hook, not shown, and with its other end 24, which may also be provided with a swivel or security hook, if desired, in the fishing-line from the casting rod, and in the other case the line 22 is attached with its end 24 in one of the holes 16 in the flanges 17 of the casting weight, which is then connected with its eye 12 to the fishing-line. For storage of the fly cast connected with the casting weight, e.g. after finished fishing, the line 22 connected with the casting weight is wound on the casting weight between its ears 13 and flanges 15 after the fishing-line has been loosened from the casting weight or the fly cast, and when a suspension means 21 so to say emerges, its fly 22 is introduced in a storage partition 6 of the casting weight through its opening 8, after which the suspension means 21 is pulled down or into the slit 9 and is safely locked. In this way the winding of the fly cast is then continued until all flies 20 have been introduced in each their storage partition 6, after which the final end of the line 22 is pulled into one or more of the slits 17 under a certain tension and the line is anchored in this way. The fly cast wound in this way will thus be stored in a safe way on and in the casting weight and without any risk that it gets entangled in itself or in other fly casts or lures, as the flies 20 are retained in their partitions by i.a. the locking of the suspension means relatively near to the flies 20. When the fly cast is then to be used it is very easy to take out and prepare these for a cast.

In FIGS. 7-13 the same reference numerals as in FIGS. 1-6 are used for the corresponding details. As distinguished from the embodiment previously described the partitions 6 in the embodiment of the invention shown in FIGS. 7-13 are made in one half of the body or the casing, i.e. in the upper half designated in FIGS. 7 and 12 by 1a, the respective partition openings 8 extending at an angle preferably bigger than 45° from the partition bottom 10 and with the locking slit 9 extending from the edge 8a of the partition opening turned away from the bottom 10 (see FIG. 13), preferably but not necessarily as far as up to the partition bottom 10, each locking slit 9 being designed as narrowing along its last portion 9a extending towards the partition bottom 10. By this design of the partitions 6 and the locking slit it is made possible that the baits, e.g. the flies 20 shown in FIG. 6, can be withdrawn in a simple way into the respective partition 6 with the aid of the suspension snells 21, which are then locked by being drawn down into the narrowing portion 9a of the respective locking slit.

Also in this embodiment the partitions 6 are separated from each other by walls 5 and from the float body 3 of the casting weight by the outer walls 5 of the outer partitions and the bottom 10 of each partition, which may consist of a bottom plate 10a common to all partitions (see FIG. 12).

As previously indicated this embodiment is composed of two parts or halves 1a and 1b, which are combined with each other by gluing, welding or in some other suitable way. For obtaining a larger bond between the parts 1a and 1b than what is permitted by the material thickness or wall thickness of the casing these parts can be designed with each their flange not shown in the drawings running substantially round about and with a surface being in the partition plane between the parts. With the parts combined to a unit this flange may be on the same level as the attaching flanges 15 lying on the same level and designed at the opposite ends of the casing, which flanges are each provided with a hole 16 for attaching a line and with lock slits 17 for a line arranged on both sides of the attaching hole 16 and narrowing inwards. At some distance from these attaching flanges 15 projecting from the body the eyes 12 are designed as projecting on the part of the casing not including the partitions 6 in order to form together with the attaching flanges 15 means for winding the line 22 supporting the suspension snells 21 around the casting weight 1 and on levels leaving the partition openings 8 and the locking slits 9 quite free, so that the lures 20 of the line 22 can be successively introduced into the partitions 6 and be locked therein by means of their suspension snells 21 when the line 22 carrying the lures and tied securely to one end of the casting weight is wound.

The present invention is not restricted to what is described above and in the drawings but can be changed, modified and supplemented in several various ways within the scope of the inventive idea indicated in the claims. Thus, each storage partition 6 can have a cylindrical form with a diameter similar to or bigger than the diameter of its associated entrance of opening, and the entrance or opening 8 of a partition need not be circular, either, but may have another suitable form.

What is claimed is:

1. A casting weight for a plurality of lures each suspended on a line by means of a suspension snell, said weight comprising an elongated hollow body weighted at one end and having means at the other end for connecting the line to the weight, a buoyant portion formed in said body, a storage compartment in said body for storing lures, when fishing is not carried on, a plurality of line engaging lug means provided at least at the opposite ends of the body and adapted to form holding points for the line as the same is wound around said body in a longitudinal direction, and means for locking the snells when the lures are placed in said storage compartment, said compartment being separated by walls from the buoyant portion of the body and comprising a plurality of pockets adapted to receive one lure each, said pockets being separated from each other by partitions and each pocket having an opening formed in a circumferential wall of said body, said locking means being in the form of slits extending from the openings and tapering toward narrow ends remote from the openings and being substantially perpendicular to the line receiving area of the body which is defined in said line engagement lug means, and said lug means being located so as to bring the line as the same is around said body to leave said openings and slits free for successive introduction of lures in said pockets and locking of their snells in said locking slits.

2. A casting weight as in claim 1 wherein said lug means includes flanges projecting from the ends of the body.

3. A casting weight as in claim 2 wherein at least one of the flanges at the ends of the body is provided with a locking means for locking said line after winding thereof on the body, this locking means having to form of a slit with a width narrowing from the free edge of the flange.

4. A casting weight as in claim 1 wherein the partitions are made in a row after each other between the ends of the casing.

5. A casting weight as in claim 1 wherein said body, at one of its ends is provided with a sealable compartment partition for receiving weights for changing the weight of the casting weight.

6. A casting weight as in claim 1 wherein said body consists of a soft plastic material.

7. A casting weight as in claim 1 in combination with a plurality of lures each suspended on a line by a suspension snell, said line being wound lengthwise around said body, each of said lures being located in a pocket and each snell being locked in the locking slit of the respective pocket, and the line leaving said opening and slits free.

* * * * *